(12) United States Patent
Reichert (10) Patent No.: US 7,401,924 B2
(45) Date of Patent: *Jul. 22, 2008

(54) PROJECTION SYSTEM AND METHOD

(75) Inventor: James Reichert, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 11/753,051

(22) Filed: May 24, 2007

(65) Prior Publication Data

US 2007/0216870 A1    Sep. 20, 2007

Related U.S. Application Data

(63) Continuation of application No. 10/760,302, filed on Jan. 21, 2004, now Pat. No. 7,222,966.

(51) Int. Cl.
*G03B 21/26* (2006.01)
*G02B 27/22* (2006.01)
*G09F 19/00* (2006.01)

(52) U.S. Cl. ............................. 353/28; 353/10; 359/478; 40/406

(58) Field of Classification Search ............... 353/10, 353/28, 62, 122; 359/443, 460; 239/16, 239/18, 20, 275, 519, 523, 524, 522, 590.5; 40/406–412, 427, 439, 440, 441, 477, 479, 40/480

See application file for complete search history.

(56) References Cited

U.S. PATENT DOCUMENTS

| | | | |
|---|---|---|---|
| 620,592 A | 3/1899 | Just | |
| 3,334,816 A | 8/1967 | Mizuno | |
| 3,560,641 A | 2/1971 | Taylor et al. | |
| 4,974,779 A | 12/1990 | Araki et al. | |
| 5,067,653 A | 11/1991 | Araki et al. | |
| 5,165,580 A | 11/1992 | Rosenthal | |
| 5,270,752 A | 12/1993 | Kataoka et al. | |
| 5,736,969 A | 4/1998 | Kuga et al. | |
| 5,737,860 A | 4/1998 | Whigham et al. | |
| 6,187,394 B1 | 2/2001 | Johnson et al. | |
| 6,857,746 B2 | 2/2005 | Dyner | |
| 7,222,966 B2 * | 5/2007 | Reichert | 353/28 |
| 2002/0067382 A1 | 6/2002 | Vega et al. | |
| 2004/0080820 A1 | 4/2004 | Palovuori et al. | |

OTHER PUBLICATIONS

Partial European Search Report dated Dec. 28, 2006, for corresponding European Application No. 05 000 836.6.

* cited by examiner

*Primary Examiner*—Rochelle-Ann Blackman
(74) *Attorney, Agent, or Firm*—Shook, Hardy & Bacon L.L.P.

(57) ABSTRACT

A method and system are provided for projecting a three dimensional image. A projection system may include a holding tank for storing a reservoir containing a projection medium and a projector including a plurality of valves for projecting the medium from the holding tank. The projection system may also include an illumination device for illuminating the projected medium and a receiving mechanism for receiving the projection medium after illumination. The projection system may also include imaging data computation apparatus for computing layered imaging data, communication and control tools for communicating the layered imaging data to the projector in order to control valves for dispersing the projection medium, and an illumination control unit that controls an illumination device for illuminated the dispersed medium.

18 Claims, 5 Drawing Sheets

PROJECTION SYSTEM AND METHOD

PRIORITY

This application is a continuation of application Ser. No. 10/760,302, U.S. Pat. No. 7,222,966 filed Jan. 21, 2004 from which priority is hereby claimed.

FIELD OF THE INVENTION

The present invention relates to the field of projection systems and more particularly to projection systems for projecting a three-dimensional image.

BACKGROUND OF THE INVENTION

Known image projection systems typically produce two-dimensional images. In order to view the images in three dimensions, several types of systems have been devised. Some of theses projection systems continue to project images in two dimensions, but create the illusion of three dimensions by providing the viewer with devices or eyeglasses specially configured to cause the projected images to appear in three dimensions. These configured devices often involve lenses, prisms, mirrors, shutter systems, polarizers, or other devices and may filter images ultimately reaching the eye based on wavelength, timing, polarization, or other factors.

To obviate the need for providing each viewer with a special viewing device, other types of projection systems cause an image to appear to all viewers in three dimensions by interposing a lenticular system in the display. These systems may further include high intensity light sources and heat management systems. The components of these systems are often expensive and the systems can be difficult and expensive to manufacture.

Furthermore, when using the above-mentioned systems, users have an extremely limited selection of viewing angles. Viewers are essentially limited to a field of less than 180 degrees since the images are projected on a flat screen or other device that is not viewable from at least 180 degrees of space. It is more likely that the image is viewable from a much more limited range of angles. Viewing angles of some known systems are entirely fixed.

Accordingly, a system is needed that includes a broader spectrum of viewing angles and is inexpensive and easy to manufacture. Furthermore, it is desirable to create a free-standing system with which a user can directly interact without fear when putting his or her hands in direct interaction with the visualized three-dimensional object.

SUMMARY OF THE INVENTION

In one aspect, the present invention is directed to a projection system for projecting a three-dimensional object within a defined volume. The projection system may include a holding tank including a reservoir containing a projection medium and a projector including a plurality of valves for projecting the projection medium from the holding tank. The projection system further includes an illumination device for illuminating the projected medium for a fixed time period and a receiving mechanism for receiving the projection medium after illumination.

In an additional aspect, the invention is directed to a method for projecting a three-dimensional object within a defined volume. The method may include forcing a projection medium through a plurality of valves contained within a projector and illuminating the forced projection medium.

In yet an additional aspect, the invention is directed to a projection system for projecting a three-dimensional object within a defined volume. The system may include imaging data computation apparatus for computing imaging data. The system may additionally include communication tools for communicating the imaging data to a projector that disperses a projection medium based on the communicated imaging data and an illumination control unit that controls an illumination device for illuminating the dispersed medium.

In a further aspect, the invention includes a method for projecting a three-dimensional object within a defined volume. The method includes storing imaging data for an image as a plurality of layers of imaging data, communicating a layer of imaging data to a projector that projects a projection medium based upon the communicated imaging data, and controlling an illumination source to illuminate the projected imaging data.

BRIEF DESCRIPTION OF THE DRAWINGS

The present invention is described in detail below with reference to the attached drawing figures, wherein.

DETAILED DESCRIPTION OF THE INVENTION

Aspects of the invention are directed to a system designed to project a three-dimensional virtual image within a defined volume. In some embodiments, the image may be animated. As will be further described below, the projected virtual image stays within the confines of a projector's viewing volume visible from viewing angles encompassing an entire circumference around the projector.

Figure 1:
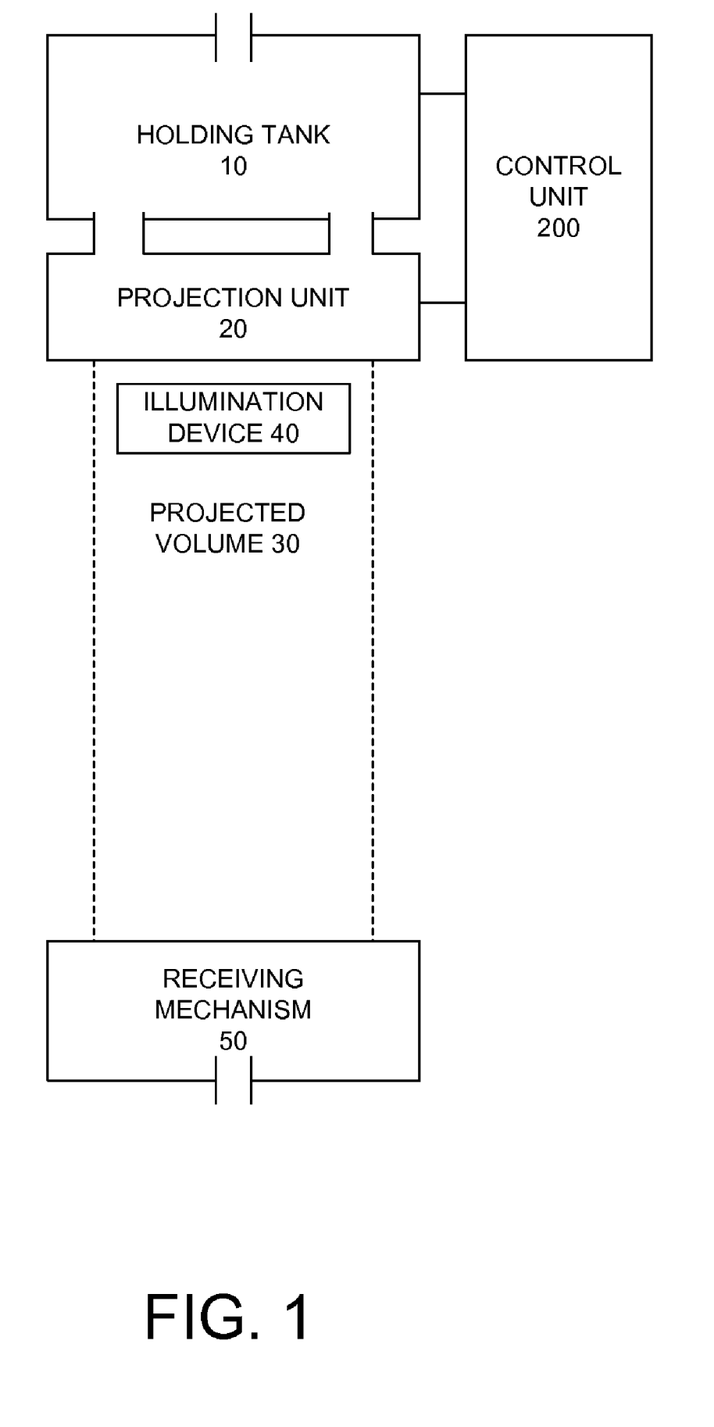
FIG. 1 is a block diagram of an embodiment of a system of the invention.

FIG. 1 is a block diagram illustrating a projection system in accordance with an embodiment of the invention. The displayed projection system includes a holding tank 10 connected with a projection unit 20. A control unit 200 communicates with the projection unit 20 and the holding tank 10. An illumination device 40 is provided for illuminating a projection medium projected from the projection unit 20 within the projected volume 30.

The holding tank 10 may be used to store a reservoir of the projection medium. In the case of a liquid medium, the holding tank 10 is pressurized in such a way as to force the liquid out at a known rate when required. The pressure within the holding tank 10 will typically be maintained at a pre-selected level.

The projection unit 20 may include a flat panel, composed of a uniform pattern of evenly spaced valves. The valves may differ depending on the type of projection medium selected. A liquid projection medium may be accommodated using pinch valves. The valves may be computer-controlled and can be open and shut independently of one another. Preferably the valves are controlled to be in either an open state or a closed state. The face of the projector may appear similar to a large-scale showerhead.

Figure 3:
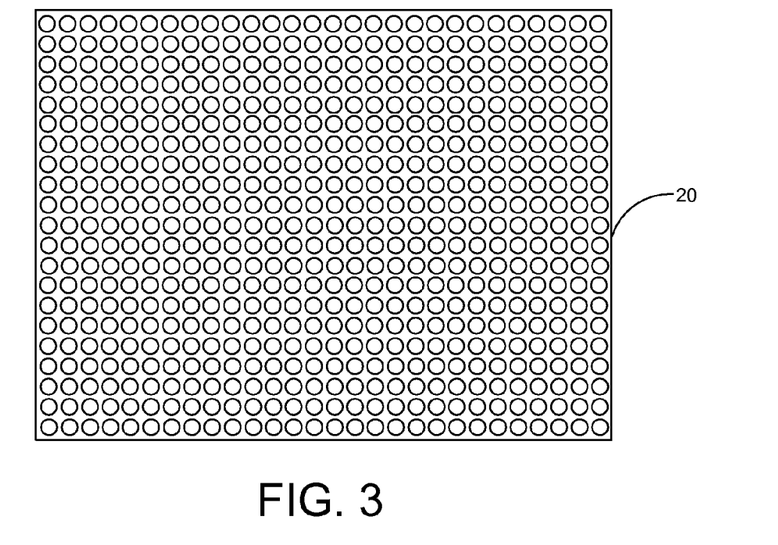
FIG. 3 is a bottom plan view of a projection component in accordance with an embodiment of the invention.

An embodiment of the projection unit 20 is shown in FIG. 3. FIG. 3 is a bottom plan view of the projection unit 20 in accordance with an embodiment of the invention. The projection medium is preferably projected downward, from above, so that it can be viewed from all sides or around an entire circumference of the projected volume 30, unobstructed by the projection system itself. As shown in FIG. 3, the projection unit 20 may include a plurality of valves 22. The valves 22 may be micro-valves located on the underside of the projection unit 20. The micro-valves may be densely packed and may open and closed based on signals from the control unit 200. Open valves 22 allow the projection medium to pass through. In operation, the holding tank is pressurized in such a way as to force the liquid out at a known rate through the projector's array of open valves.

A variety of projection mediums including sand, dust, steam, vapor, and liquid may be used. In a preferred embodiment, the projection medium includes liquid beads. Optionally, the liquid beads may be colored liquid beads used to provide a color image.

The illumination device 40 is used to illuminate the projected medium within the projected volume 30. In one embodiment of the invention, the illumination device 40 is mounted on a bottom face of the projection unit 20. This mounting configuration keeps the illumination device 40 from irritating the eye of the viewer and more importantly keeps the system compact and unobstructed from any side-viewing angle. The illumination device 40 could be mounted in interstitial spaces between micro-valves 22 or could include lights spaced around an outer perimeter of the bottom face of the projection unit 20. Alternatively, the illumination device 40 could include one or more bulbs disposed in a center area of the bottom face of the projection unit 20. Other illumination device placements are possible, including placement of the illumination device 40 within the receiving mechanism 50 as will be illustrated below.

The illumination device 40 may be a strobe light capable of producing high intensity, short duration light pulses or may include LED, halogen, or other types of bulbs having a flashing rate controlled by the control unit 200 as will be further explained below. The illumination device 40 may periodically strobe the columns of the projection medium falling from the projection unit 20 at high rates to reveal a moving image.

Figure 4:
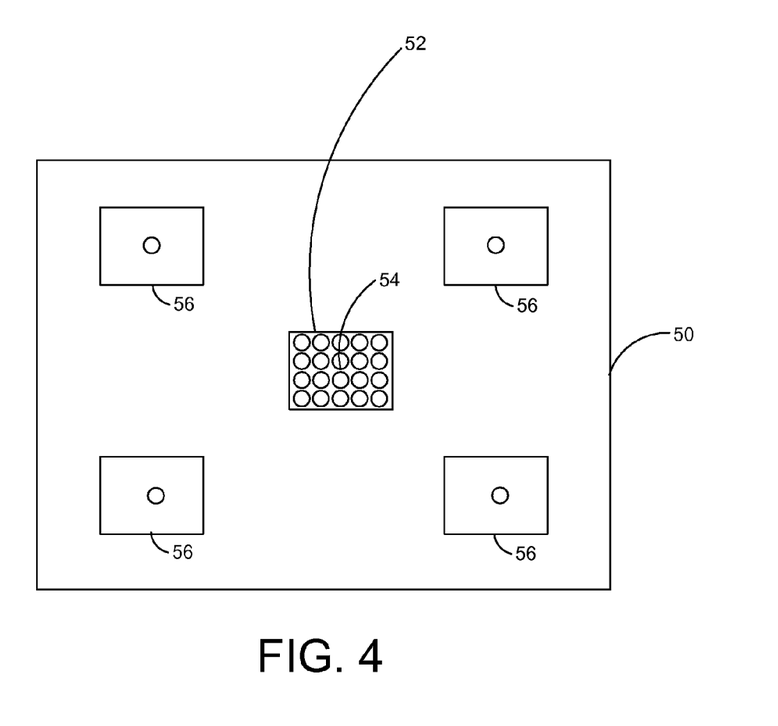
FIG. 4 is a plan view of a receiving system in accordance with an embodiment of the invention.

FIG. 4 is a top plan view of the receiving mechanism 50 in accordance with an embodiment of the invention. In an embodiment of the invention in which the projection medium is a liquid medium, the receiving mechanism 50 may include a container such as a sink with a drain 52 having a plurality of apertures 54. As set forth above, the receiving mechanism 50 may further include illumination devices 56 for illuminating the projected volume 30. The illumination devices 56 may be similar to the illumination device 40 described above and may be used in addition to or instead of the illumination device 40. The control unit 200 controls the flashing of the illumination devices 56 when a frame is ready for display.

The receiving mechanism 50 either causes the projection medium caught in the drain to be reclaimed or disposes of the liquid. If the receiving mechanism 50 causes the projection medium to be reclaimed, it will pump the projection medium back in to the holding tank 10. In the case of non-liquid mediums, the medium may fall on a treadmill, which would carry the medium to an edge of the viewing volume, for disposal or reclamation. The receiving mechanism 50 may additionally include a sorting mechanism if the projection medium includes multiple colors. The sorting mechanism would sort the colored medium by color for reclamation.

The control unit 200 controls both the discharge of the projection medium and the manipulation of the illumination device 40. The control unit 200 may be operable within a computing environment as described below with reference to FIG. 2.

Figure 2:
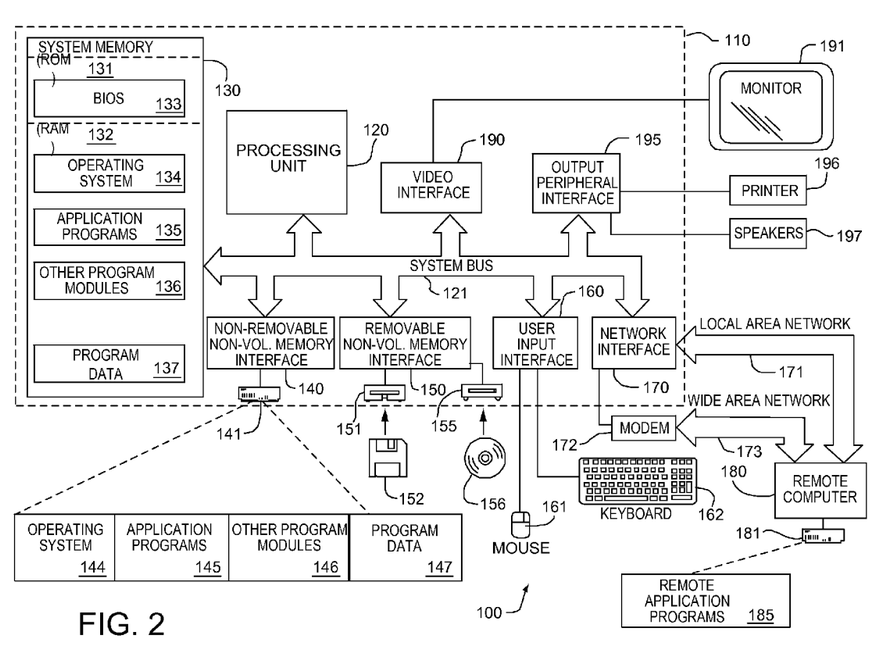
FIG. 2 is a block diagram showing a suitable computing environment for implementing the system of the invention.

FIG. 2 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention may be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

With reference to FIG. 2, an exemplary system 100 for implementing the invention includes a general purpose computing device in the form of a computer 110 including a processing unit 120, a system memory 130, and a system bus 121 that couples various system components including the system memory to the processing unit 120.

Computer 110 typically includes a variety of computer readable media. By way of example, and not limitation, computer readable media may comprise computer storage media and communication media. The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a USB. A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 in the present invention may operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

Figure 5:
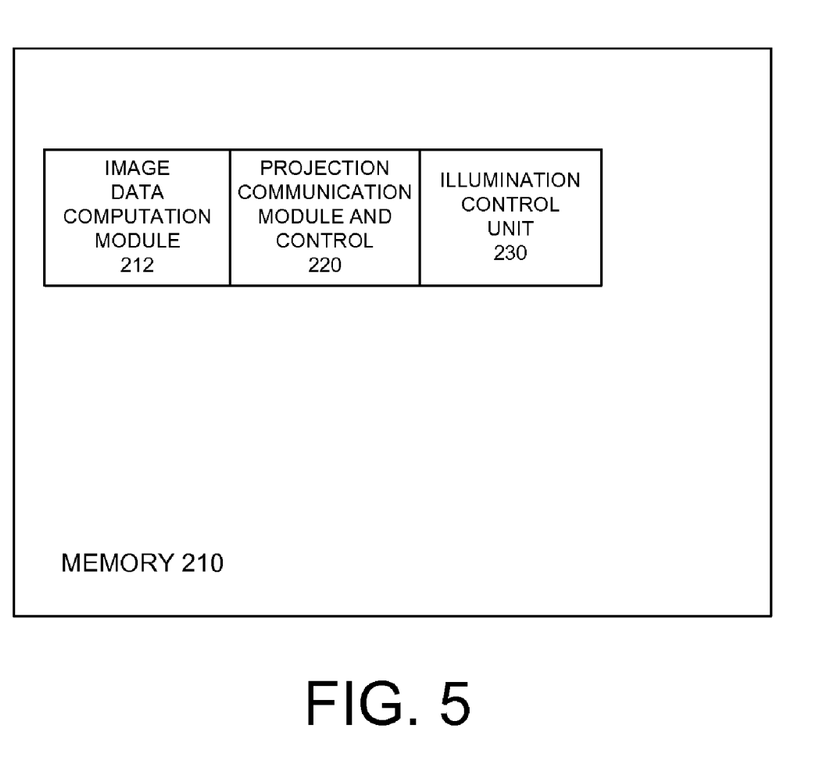
FIG. 5 is a block diagram illustrating software components for controlling the projection system in accordance with an embodiment of the invention.

FIG. 5 is a block diagram illustrating software components in accordance with an embodiment of the invention. FIG. 5 illustrates a memory 210 of a control unit 200. The memory may include any type of memory such as those described above with reference to FIG. 2. The memory 210 may include an image data computation module 212, a projection communication and control module 220, and an illumination device control unit 230. The image data computation module 212 is preferably capable of computing data to be transmitted for each projection frame. In order to project a three-dimensional volume, the data for that volume must be stored in an appropriate format. Accordingly, the image data computation module 212 slices the object for projection vertically and equidistantly into a number of cross-sections. Next, taking each cross-section, the data computation module 212 overlays a grid. The number of rows and columns in the grid corresponds to the number of rows and columns of micro-valves 22 in the projector head 20. If a threshold value, for example at least 50% of a grid square has volume within it, the data computation module 212 marks the grid square as "lit". This is done for each grid square for each sheet or layer of volume, top to bottom. The final result is composed of a list of lit and unlit signifiers and is enough to render a static volume.

However, if animation is required, the above-described computation and storage method is used on each frame of the animation, basically creating a three-dimensional "flip-book" of animation. Once composed, this data can be fed directly to the projection communication and control module 220 that communicates with the projection unit 20 to control the micro-valves 22.

The control unit 200 may be varied in accordance with embodiments of the invention. For instance, the rate of rendering may be varied to produce a color version of the image. In this instance, three similar frames could be illuminated with red, green, and blue illumination devices respectively. The three frames would be somewhat different based on the color required at each individual voxel. The persistence of vision on the retina should be able to blend individual voxels to represent the cardinal color spectrum. Accordingly, while a black and white image may be projected at 60 frames per second, a color version of the same image could be projected at 20 frames per second.

Figure 6:
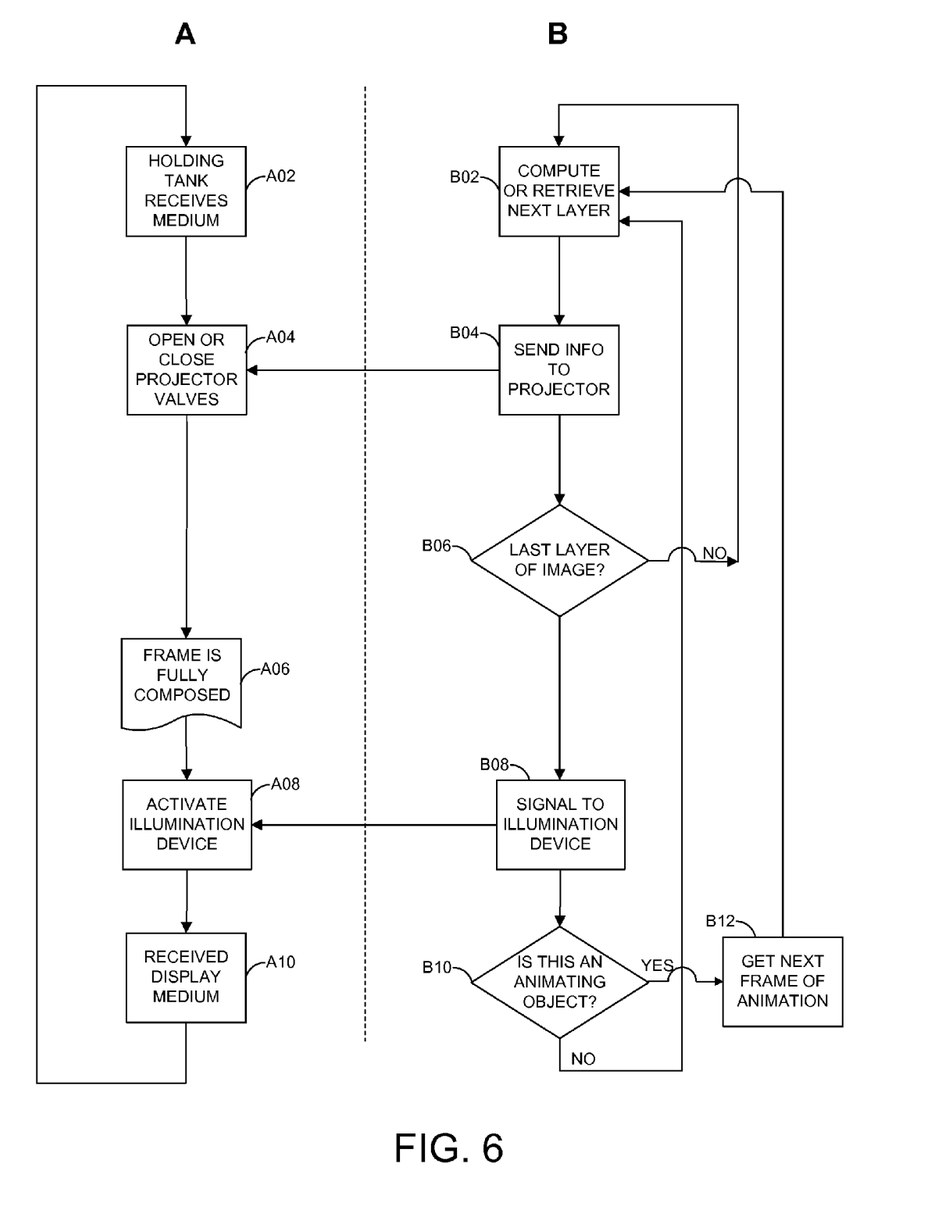
FIG. 6 is a flow chart illustrating a method for operating the projection system in accordance with an embodiment of the invention.

FIG. 6 is a flow chart illustrating an embodiment of a method for operating a projection system of the invention. Side A of the flow chart illustrates the steps taken by hardware components including the projection unit 20, the illumination device 40, and the receiving mechanism 50. Side B of the flowchart illustrates the steps taken by software components such as the image data computation module 220, the projection communication and control module 220, and the illumination device control unit 230.

As a preparatory step, the holding tank 10 receives a projection medium in step A02. In step B02, the data computation unit 212 computes or retrieves a layer of imaging data as described above. At a time t, a lowest layer of data is fed into the projector circuitry in step B04 by the projection communication and control unit 220 and in step A04, micro-valves 22 open or close depending on whether they are being fed a "lit" or "unlit" signifier. These micro-valves 22 respond to their signals in unison.

At a subsequent time t+1, an earlier layer of medium has fallen a specified number of units, dependent upon the force with which the projection medium is ejected from the projection unit 20. If the previous layer of data was not the last layer as determined in step B06, the process repeats for additional data at time t+1 and again creates a sheet or layer of the three-dimensional volume in step A06. This procedure is repeated for each sheet that has been stored for the volume. The above-described procedure produces a blurry volume falling through unobstructed space. The volume, called a frame, moves so quickly that it is difficult to see.

In order to freeze this frame in space and make it observable, the illumination device control unit 230 sends a signal to the illumination device 40 in step B08, which may be a strobe light that quickly strobes a strong light source in step A08. Based on the type of light used and the chemical composition of the medium, the droplets within the frame will light up while all the other areas will remain dark. This process will produce a recognizable three-dimensional volume 30, apparently frozen in space. In step A10, the receiving mechanism 50 receives the display medium and uses one of the reclamation or disposal techniques described above.

Each frame is visible only momentarily. Accordingly, the data computation unit 212 immediately begins rendering the volume again if another data layer is available. In the case of a static volume, the data computation unit 212 will simply repeat the earlier data. If animation is desired as shown in step B10, the data computation unit 212 feeds a similar, but slightly different, variant of the previous volume. Otherwise, the system proceeds to the next frame in step B12.

To fool the eye into thinking it is seeing a true volume in space, the illuminating device 40 must flash at a rate that is dictated by the persistence of the volume on the human retina. Films normally operate at 24 frames per second, but even rates as low as 5 frames per second are viable. After each frame is rendered and illuminated, the frame is discarded. It simply falls into the receiving mechanism 50 and the medium is either carried away or reclaimed.

In summary, embodiments of the invention include a projection system having many advantages. The disclosed system enables a full range of viewing angles and enables viewers at different positions each to observe a unique view of the projected image. For instance, a viewer observing from a front of the image would see a front view and a viewer observing from a back of the image would see a back view. Accordingly, each viewer sees the image correctly rendered based upon his or her perspective. Additionally, because of the inexpensive materials used to create the system, the system can be made very large. Furthermore, because the materials are not harmful or toxic, a viewer can stand within the system and interact with the projected image.

The present invention has been described in relation to particular embodiments, which are intended in all respects to be illustrative rather than restrictive. Alternative embodiments will become apparent to those skilled in the art to which the present invention pertains without departing from its scope.

From the foregoing, it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and with the scope of the claims.

I claim:

1. A projection system for projecting a three-dimensional object within a defined volume, the projection system comprising:
    a holding tank for storing a reservoir containing a projection medium;
    a projector including a plurality of valves for projecting the projection medium from the holding tank;
    an image data computation module for calculating cross-sections for the three-dimensional object;
    a projection communication and control module for communicating the calculated cross-sections for the three-dimensional object to the projector in order to control the valves, wherein the valves are micro-valves that are opened and closed based on the calculated cross-sections and projection medium is forced from the holding tank through the open valves;
    an illumination device for illuminating the projection medium for a fixed time period, wherein the projected medium forms the three-dimensional object, and the three-dimensional object is viewable circumferentially; and
    a receiving mechanism for receiving the projection medium after illumination.

2. The projection system of claim 1, wherein the projection medium comprises a liquid.

3. The system of claim 1, further comprising an illumination device control unit for controlling operation of the illumination device.

4. The system of claim 1, wherein the receiving mechanism includes a reclamation tray for reclaiming the projection medium for further use.

5. The system of claim 1, wherein the receiving mechanism includes a drain for disposing of the projection medium.

6. The system of claim 1, wherein the illumination device comprises a strobe light that is mounted to a face of the projector.

7. A projection system for projecting a three-dimensional object within a defined volume, the projection system including:
    imaging data computation apparatus for computing imaging data by calculating cross-sections for the three-dimensional object and overlaying a grid on the calculated cross-sections, wherein the number of rows and columns in the grid corresponds to the number of grids and columns of valves in a projector;
    communication tools for communicating the imaging data to the projector that disperses a projection medium by opening or closing the valves based on the communicated imaging data, wherein the valves are micro-valves and projection medium is forced from the holding tank through the open valves; and
    an illumination control unit that controls an illumination device for illuminating the dispersed medium, wherein the projection medium forms the three-dimensional object, and the three-dimensional object is viewable circumferentially.

8. The projection system of claim 7, wherein the communication tools control a plurality of valves within the projector to disperse the projection medium.

9. The projection system of claim 7, wherein the imaging data computation apparatus computes multiple discrete layers of imaging data.

10. The projection system of claim 7, further comprising a reclamation system for reclaiming projection medium after illumination, a disposal for disposing of the projection medium after illumination, a holding tank for storing a reservoir containing the projection medium, and a projector including a plurality of valves for projecting the projection medium.

11. The projection system of claim 7, wherein the illumination device comprises a strobe light.

12. The projection system of claim 7, wherein the projection medium comprises a liquid.

13. The projection system of claim 11, wherein the strobe light is mounted to a face of the projector.

14. A method for projecting a three-dimensional object within a defined volume, the method comprising:
- storing imaging data for an image as a plurality of layers of imaging data;
- communicating a layer of imaging data to a projector having valves that projects a projection medium based upon the communicated imaging data, wherein the valves are micro-valves that are opened and closed based on calculated cross-sections and projection medium is forced from the holding tank through the open valves; and
- controlling an illumination source to illuminate the projection medium, wherein the projection medium forms the three-dimensional object, and the three-dimensional object is viewable circumferentially.

15. The method of claim 14, further comprising computing imaging data by calculating cross-sections for the image, wherein the cross-sections represent the plurality of layers of imaging data, and transmitting the imaging data to the projector to control the valves.

16. The method of claim 15, further comprising opening selected valves based on the imaging data such that a quantity of projection medium falls from the projector.

17. The method of claim 14, further comprising controlling a strobe light for illumination of the projection medium, reclaiming the projection medium for reuse after illumination, disposing of the projection medium after illumination, and filling a holding tank with the projection medium.

18. A computer-readable medium having computer-executable instructions for performing the method recited in claim 14.

* * * * *